Feb. 7, 1939.  C. G. KRONMILLER  2,146,681
MOTOR OPERATED VALVE
Filed April 12, 1935  2 Sheets-Sheet 1
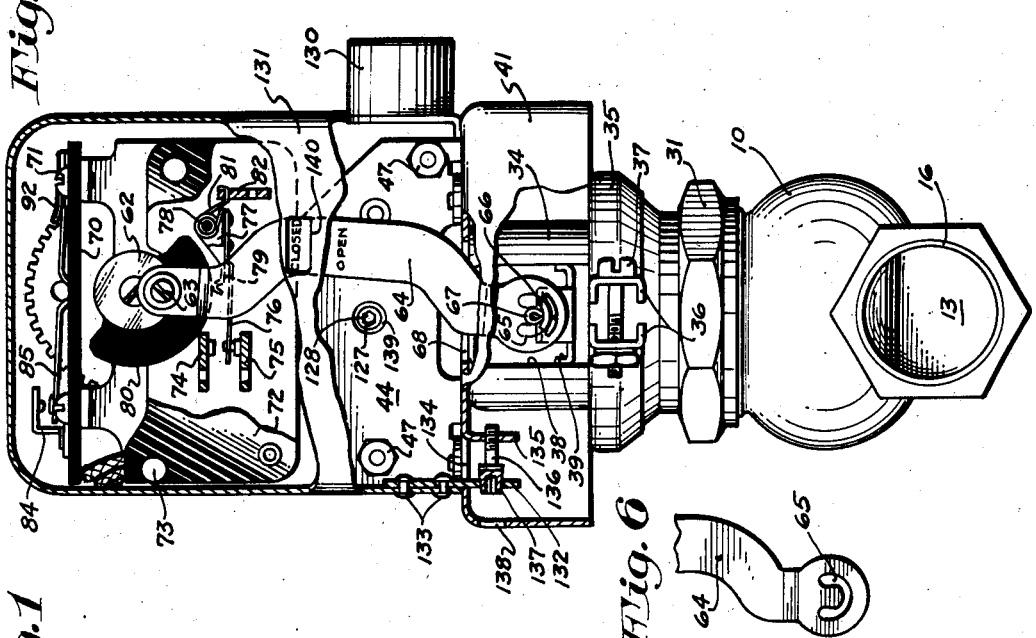
INVENTOR
Carl G. Kronmiller
BY HIS ATTORNEY
George H Fisher Feb. 7, 1939.  C. G. KRONMILLER  2,146,681
MOTOR OPERATED VALVE
Filed April 12, 1935  2 Sheets-Sheet 2

INVENTOR
Carl G. Kronmiller
BY HIS ATTORNEY
George H. Fisher.

Patented Feb. 7, 1939

2,146,681

UNITED STATES PATENT OFFICE 2,146,681

MOTOR OPERATED VALVE

Carl G. Kronmiller, Minneapolis, Minn., assignor to Minneapolis-Honeywell Regulator Company, Minneapolis, Minn., a corporation of Delaware Application April 12, 1935, Serial No. 15,965

18 Claims. (Cl. 137—139)

This invention relates to motor operated valves and finds particular utility in controlling the flow of a heating medium to a radiator.

It is an object of this invention to provide a motor operated valve of novel construction that is compact in form requiring little space, that is so arranged that the parts are freely accessible and that is efficient in operation.

Another object is to provide a valve mechanism of the class described where over-travel of the valve operating mechanism is effectively eliminated.

Still another object is to provide a novel strain release construction between the valve and the valve operator whereby distortion or breakage of the parts is prevented.

A further object is to provide a novel connection between the valve proper and the valve operator.

A further object is to provide an enclosure for the valve operator, having openings therein whereby manual operation of the valve is permitted and whereby visual indications of the position of the valve may be obtained.

Still another object is to provide a novel enclosure securing means whereby the enclosure is maintained over the valve operating mechanism to prevent uninstructed tampering therewith.

Other objects and advantages will become apparent to those skilled in the art by reference to the accompanying specification, claims and drawings in which drawings:

Fig. 1 is a vertical sectional view through the structure of my invention.

Fig. 2 is an elevational view taken along the line 2—2 of Fig. 1 with parts broken away for clearer illustration of the structure.

Fig. 5 is a horizontal sectional view taken along the lines 5—5 of Fig. 1.

Fig. 6 is a detailed view of a portion of an element utilized in my invention.

Figure 7:
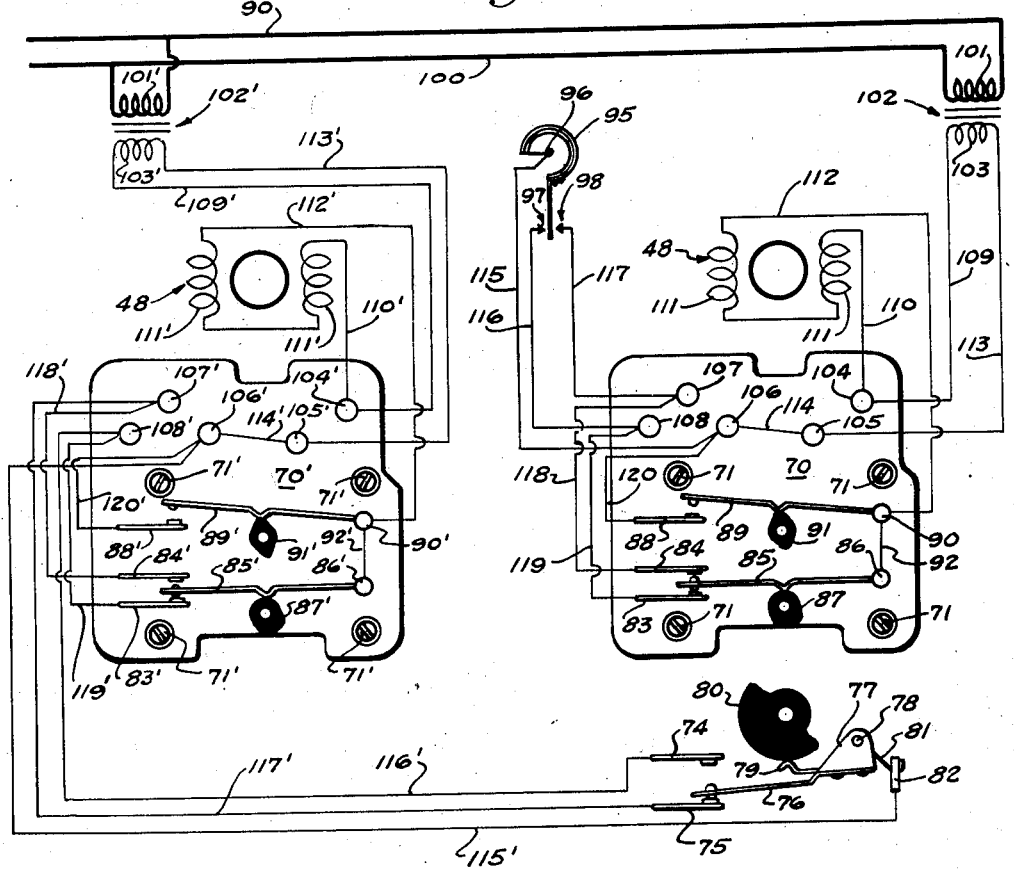
Fig. 7 is a sechematic wiring diagram showing the operation of the motor operated valve of this invention along with a dual control for operating another motor operated valve.

Referring now to Fig. 1, a valve casing is designated at 10. The valve casing 10 is provided with a transverse partition 11 which divides the valve casing 10 into an outlet chamber 12 and an inlet chamber 13. Fluid is taken from the outlet chamber 12 and supplied to a radiator (not shown) by means of a flanged nipple 14 which is secured to the valve casing 10 in a fluid tight manner by a union nut 15. Fluid is supplied to the inlet chamber 13 of the valve casing 10 through a threaded opening 16.

The transverse partition is provided with a port opening 17. An annular valve seat 18 encompasses the port opening 17 and is adapted to be engaged by a valve 19. The valve 19 is reinforced by means of a reinforcing cup 20. The valve 19 and the reinforcing cup 20 are rigidly secured to an abutment member 21 by means of a nut 22 screw-threaded on the abutment member 21.

The abutment member 21 is provided at its upper extremity with an abutment 23 which is adapted to engage an abutment 24 located in the lower extremity of a valve stem 25. These abutments 23 and 24 are so arranged that a lost motion is present between these members so that a slight relative movement between the valve stem 25 and abutment memebr 21 is permitted. Encircling the valve stem 25 is a sleeve 26 which abuts against a cross-head 27. The cross-head 27 is retained on the valve stem 25 by means of a cup washer 28 and a split-lock ring 29 located in an annular groove in the valve stem 25. A spring 30 extends between the abutment member 21 and the sleeve 26 to resiliently hold the parts in their relative positions. The spring 30 holds the sleeve 26 against the cross-head 27 and thereby holds the cross-head 27 against the lock ring 29. The spring also normally tends to extend the lost motion connection between the valve stem 25 and the abutment member 21.

A coupling 31 is screw-threaded on the valve casing 10. Located on the upper surface of the coupling 31 is a guide member 32 for the sleeve and a cross-head guide 34 for the cross-head 27. The guide 32 and the cross-head guide 34 are clamped to the coupling 31 by means of a band 35 having flanges 36 through which extend a screw and nut arrangement 37 which tensions the band 35. In this manner, the cross-head guide 34 and the sleeve guide 32 are rigidly secured to the coupling member 31 to provide a guide means for the valve stem and a guide means for the cross-head. The cross-head guide 34 is provided with longitudinally extending slots 38 through which the cross-head 27 extends to guide the same. The cross-head 27 is provided with reinforcing ribs 39 extending longitudinally thereof. Secured between the coupling 31 and the abutment member 21 in a fluid tight manner is a bellows 40 which seals the valve chamber 12 from communication with the surrounding atmosphere.

A motor base 41 is secured to the cross-head guide 34 by means of rivets 42. Extending upwardly from the motor base 41 are spaced parallel plates 43 and 44. These plates are secured to the motor base 41 by means of screws 45. The plates 43 and 44 are held in spaced relation by means of spacers 46 and the nut and screw arrangements 47.

Located on the outer face of the plate 43 by means of spacers 49 and screws 50 is a motor 48. The motor shaft extends through the plate 43 and has a motor pinion 51 located on the inner end thereof. The motor pinion 51 is in driving engagement with a fibre gear 52. Mounted for rotation with the fibre gear 52 is a pinion 53 which engages a gear 54. The gear 54 rotates a pinion 55 which engages a gear 56. The gear 56 drives the pinion 57 which in turn drives the gear 58. A pinion 59 rotates with the gear 58 and drives a gear 60. All the gears and pinions are suitably mounted on shafts extending between the two plates 43 and 44. The gear 60, however, is mounted on a drive shaft 61 which extends through the plates 43 and 44 and is provided at its extremities with crank discs 62.

Pitmans 64 are secured to the crank discs 62 by means of screws 63. The pitmans 64 extend downwardly through openings 68 in the motor base 41 and connect to the cross-head 27 in novel manner. Referring to Fig. 6, it is seen that the lower extremities of the pitmans 64 are provided with arcuate openings 65. These arcuate openings 65 are adapted to receive arcuate extensions 66 of the cross-head 27. Displacement of the pitmans 64 with respect to the extensions 66 of the cross-head 27 is prevented by means of cotter pins 67 extending through the extensions 66. By reason of this novel connection between the cross-head and the pitmans, a large bearing surface is afforded to prevent excessive wear of the parts and which affords an inexpensive mode of manufacture.

Secured to the upper ends of the spaced plates 43 and 44 by means of screws 71 is a panel board 70 made of insulating material. Secured to the outer surface of the plate 44 by means of nut and screw arrangements 73 are spaced panels 72 also made of insulating material. The spaced panels 72 carry spaced contact members 74 and 75 which are adapted to be alternately engaged by a contact arm 76. The contact arm 76 is mounted on a bracket 77 which is pivoted to the spaced panels 72 by means of a pivot 78. The bracket 77 is also provided with a cam follower 79 which is adapted to engage the periphery of cam 80, mounted on the drive shaft 61 in any suitable manner. The cam follower 79 is maintained in engagement with the cam 80 by means of a spring 81 wound about the pivot 78 and secured to a bracket 82 extending between the spaced panels 72. When the high dwell of the cam 80 engages the cam follower 79, the contact arm 76 is held in engagement with the contact 75 and when the cam follower 79 rides off of the high dwell of the cam 80, the contact arm 76 is moved into engagement with the contact 74 by means of the spring 81.

Figure 3:
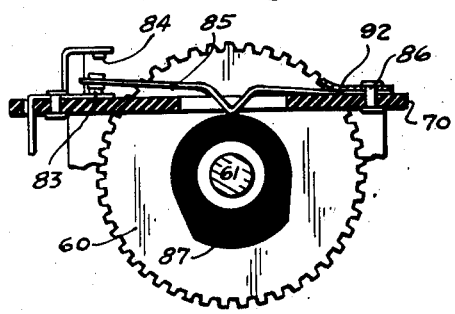
Fig. 3 is a vertical sectional view taken substantially on the line 3—3 of Fig. 1.

Located on the panel 70 are contact members 83 and 84 which are adapted to be alternately engaged by a contact arm 85 which in turn is secured to the panel board 70 by means of a rivet 86. The contact arm 85 engages a cam 87. When the high dwell of the cam engages the contact arm 85, the contact arm is brought into engagement with the upper contact 84 and when the low dwell of the cam 87 engages the contact arm 85, the contact arm 85 is moved into engagement with the contact 83. This construction is clearly shown in Fig. 3.

Figure 4:
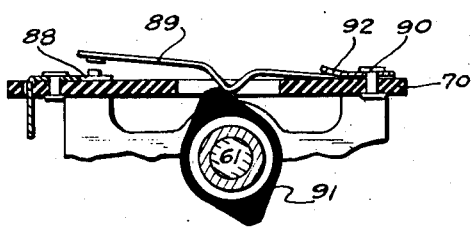
Fig. 4 is a vertical sectional view taken substantially on the line 4—4 of Fig. 1.

Referring to Fig. 4, a contact member 88 is secured to the panel board 70 and a contact arm 89 is also secured to the panel board 70 by means of a rivet 90. The contact arm 89 engages a cam 91 having two high dwells which break contact between the contact 88 and the contact arm 89. A member 92 engages the contact arms 89 and 85 to maintain the same against the periphery of the cams 91 and 87. This member 92 also acts as a conductor between the contact arms 85 and 89.

Referring now to Fig. 7, a condition responsive device 95 which may take the form of a room thermostat is mounted on a post 96. The thermostat is adapted to engage contacts 97 or 98. Line wires 99 and 100 lead from some supply of power not shown and connected across these line wires 99 and 100 is a primary 101 of a stepdown transformer 102. The transformer 102 is provided with a secondary 103.

The panel board 70 is provided with five binding posts 104, 105, 106, 107 and 108. One end of the secondary 103 of the transformer 102 is connected by means of a wire 109 to the binding post 104. The binding post 104 is in turn connected by means of a wire 110 to the field 111 of the motor 48. The field 111 is in turn connected by means of a wire 112 to the rivet 90. The other end of the secondary 103 of the transformer 102 is connected by means of a wire 113 to the binding post 105 which is in turn connected by means of a wire 114 to the binding post 106. The binding post 96 of the thermostat 95 is also connected by means of a wire 115 to the binding post 106. Contact 97 of the thermostat 95 is connected by a wire 116 to the binding post 108 and the contact 98 is connected by means of a wire 117 to the binding post 107. The binding post 107 is connected by means of a wire 118 to the contact 84, the binding post 108 is connected by means of a wire 119 to the contact 83 and the binding post 106 is connected by means of a wire 120 to the contact 88.

With the parts in the position shown in Fig. 7, assume that the valve is closed and that a decrease in temperatures moves the thermostat 95 into engagement with the contact 97. A circuit is completed by such movement from the secondary 103 of the transformer 102 through wire 109, wire 110, field 111, wire 112, conductor 92, contact arm 85, contact 83, wire 119, wire 116, contact 97, thermostat 95, binding post 96, wire 115, wire 114, and wire 113 back to the secondary 103. This starts rotation of the motor 48 and movement of the valve 19 towards open position through the gear train contained between the two plates 43 and 44. After this first initial movement, one of the high dwells of the cam 91 is moved out of engagement with the contact arm 89 to complete a holding circuit from the secondary 103 through wire 109, wire 110, field 111, wire 112, contact arm 89, contact 88, wire 120, wire 114 and wire 113 back to the secondary 103. This maintaining circuit will remain completed until the other high dwell of the cam 91 breaks contact between the contact 88 and the contact arm 89. By the time this contact is broken, the valve 19 is moved to its complete open position. Also, at this time, the cam 87 is moved through 180° to move the contact arm 85 into engagement with the contact 84 to position the circuit for closing movement of the valve.

When the temperature rises above a predetermined value, the thermostat 95 is moved into engagement with the contact 98 to complete a circuit from the secondary 103 of the transformer 102 through wire 109, wire 110, field 111, wire 112, conductor 92, contact arm 85, contact 84, wire 118, wire 117, contact 98, thermostat 95, wire 115, wire 114 and wire 113 back to the secondary 103 to start the valve towards its closed position. After the valve has been started towards its closed position in the above described manner, the high dwell of the cam 91 is moved out of engagement with the contact arm 89 to make contact between the contact arm 89 and the contact 88 to complete a holding circuit from the secondary 103 through wire 109, wire 110, field 111, wire 112, contact arm 89, contact 88, wire 120, wire 114 and wire 113 back to the secondary. This holding circuit remains completed until the valve 19 has been moved to the closed position as shown in Fig. 1. When the valve is so moved to closed position, the cam 91 moves the contact arm 89 out of engagement with the contact 88 to break the above described maintaining circuit to stop operation of the motor. When the motor stops, the contact arm 85 is in engagement with the contact 83 to position the circuit for opening movement.

The drive shaft 61 drives the cam 80 to move the contact arm 76 into engagement with either contacts 74 or 75. Contacts 74 and 75 correspond with contacts 97 and 98, respectively, of the thermostat 95 and the operation of the motor shown at the left of Fig. 7 is identical with that shown at the right. Like reference characters have been primed and used in the left hand portion of Fig. 7. Since the cam 80 is driven by the drive shaft 61 and since the cam 80 controls the left hand valve in Fig. 7, the left hand valve will follow the operation of the right hand valve. As is noted, cam 80 is off-set at an angle with respect to the cams 87 and 91. The reason for this is to decrease the time lag required to operate the second valve with respect to the first valve.

The lost motion connection provided by the abutments 23 and 24 (Fig. 1) and the spring means 30 which normally maintains this lost motion extended provide a strain release connection between the motor 48 and the valve 19 so that complete rotation of the motor 48 is permitted without any binding action which might be caused by the valve 19 engaging its seat 18 before the drive shaft 61 has rotated through 180°.

Referring to Fig. 5, the shaft 122 which carries the gear 52 and the pinion 53 is provided with a shoulder 121. Loosely mounted on the shaft 122 and in engagement with the shoulder 121 is a friction collar 123. The collar 123 is provided with flattened portions 124 which are adapted to be engaged by the bifurcated end of a leaf spring 125 which is secured to the plate 44 by means of a screw 126. The leaf spring 125 maintains the collar 123 in frictional engagement with the shoulder 121. The bifurcated end of the leaf spring 125 co-acts with the flattened surfaces 124 to prevent rotation of the collar 123. By reason of this construction, a retarding or braking force is applied to the gear train. The amount of retarding force may be adjusted by manipulating the screw 126 which varies the force of the leaf spring 125. This retarding force is not sufficient to hinder the operation of the motor 48 but it is sufficient to overcome the inertia of the motor and the gear train to prevent rotation of the motor and the gear train after the motor has been deenergized. By reason of this friction structure, over-travel of the motor beyond its extreme positions is entirely prevented.

The shaft which supports the pinion 57 and the gear 56 is extended outwardly beyond the plate 44 as shown at 127. This extension 127 is provided with a longitudinally extending hexagonal opening for receiving an Allen wrench. By inserting the Allen wrench in this hexagonal opening 128, the gear train and the motor, and consequently the valve, may be rotated to manually position the valve in any position desired.

Mounted on the motor base 41 as shown in Fig. 2 is a conduit fixture 130 through which the wiring for automatically operating the valve may be led.

The operating structure above described may be enclosed by means of a cover 131. A downwardly extending strip 132 is riveted to the cover 131 by means of rivets 133 and extends through an opening 134 in the motor base 41 formed by the punching out of a lip 135. The downwardly extending lip 135 is provided with a screw-threaded opening adapted to receive a screw 136, having a tapered head 137. The tapered head 137 is adapted to engage in an opening in the downwardly extending strip 132. The tapered head 137 is provided with a hexagonal opening adapted to receive an Allen wrench. The motor base 41 is provided with an opening 138 through which the Allen wrench may be extended to move the tapered head 137 into and out of engagement with the opening in the downwardly extending strip 132. This forms an effective means for locking the cover 131 in place to prevent uninstructed tampering with the valve mechanism.

The cover 131 is provided with an opening 139 through which the Allen wrench for manually operating the valve may be extended so that the valve may be manually operated without removing the cover.

The cover 131 is also provided with an elongated opening 140 (Fig. 2) which is adapted to cooperate with indicia illustrated as "open" and "closed" located on one of the pitmans 64 to give a visual indication of the position of the valve 19.

From the above, it is seen that I have provided a motor operated valve of novel construction, that is compact in form requiring little space, that is so arranged that the parts are freely accessible and that is efficient in operation.

Although I have disclosed one embodiment of this invention, I do not wish to be limited by this particular showing. Other embodiments may become apparent to those skilled in the art and I wish to be limited only by the scope of the appended claims and the prior art.

I claim as my invention:

1. In a device of the class described, a valve casing, a valve operable therein, a valve stem extending outwardly from said casing, a lost motion connection between the valve and the valve stem, an abutment on said valve stem, a cross-head mounted on the valve stem, means for operating the cross-head, a sleeve encircling the valve stem and engaging the cross-head, and a spring between the sleeve and the valve to extend the lost motion connection and urge the cross-head into engagement with the abutment.

2. In a device of the class described, a valve casing, a valve operable therein, a valve stem extending outwardly from the casing, a cross-head mounted on the valve stem, supporting means mounted on the valve casing including spaced upright plates, motor means mounted on the exterior of one of the plates, gear reducing means mounted between the plates, a shaft driven by said gear reducing means and extending outwardly of said plates, and motion transmitting means connected between the shaft and the cross-head and located exteriorly of said plates.

3. In a device of the class described, a valve casing, a valve operable therein, a valve stem extending outwardly from the casing, a cross-head mounted on the valve stem, supporting means mounted on the valve casing including spaced upright plates, motor means mounted on the exterior of one of the plates, gear reducing means mounted between the plates, a shaft driven by said gear reducing means and extending outwardly of said plates, motion transmitting means connected between the shaft and the cross-head and located exteriorly of said plates, a lost motion connection between the valve and the valve stem, and resilient means to extend the lost motion connection to provide a strain release connection between the motor means and the valve.

4. In a device of the class described, a valve casing, a valve operable therein, a valve stem extending outwardly from the casing, a cross-head mounted on the valve stem supporting means mounted on the valve casing including spaced upright plates, motor means mounted on the exterior of one of the plates, gear reducing means mounted between the plates, a shaft driven by said gear reducing means and extending outwardly of said plates, motion transmitting means connected between the shaft and the cross-head and located exteriorly of said plates, a lost motion connection between the valve and the valve stem, resilient means to extend the lost motion connection to provide a strain release connection between the motor means and the valve, a cover enclosing the movable parts, and means for securing the cover to the supporting means.

5. In a device of the class described, a valve casing, a valve operable therein, a valve stem extending outwardly from the casing, a cross-head mounted on the valve stem, supporting means mounted on the valve casing including spaced upright plates, motor means mounted on the exterior of one of the plates, gear reducing means mounted between the plates, a shaft driven by said gear reducing means and extending outwardly of said plates, motion transmitting means connected between the shaft and the cross-head and located exteriorly of said plates, a lost motion connection between the valve and the valve stem, resilient means to extend the lost motion connection to provide a strain release connection between the motor means and the valve, a cover enclosing the movable parts, an opening in said cover, and indicia on the motion transmitting means cooperable with the opening to visually indicate the position of the valve.

6. In a device of the class described, a valve casing, a valve operable therein, a valve stem extending outwardly from the casing, a cross-head mounted on the valve stem, supporting means mounted on the valve casing including spaced upright plates, motor means mounted on the exterior of one of the plates, gear reducing means mounted between the plates, a shaft driven by said gear reducing means and extending outwardly of said plates, motion transmitting means connected between the shaft and the cross-head and located exteriorly of said plates, a lost motion connection between the valve and the valve stem, resilient means to extend the lost motion connection to provide a strain release connection between the motor means and the valve, a shaft included in the gear reduction extending outwardly of one of the plates, a cover enclosing the movable parts, and an opening in the cover to permit manipulation of the extended shaft to manually position the valve.

7. In a device of the class described, a motor, an actuator shaft, gear reduction means between the motor and the actuator shaft, means driven by the actuator shaft to complete a function, supporting means for the motor, shaft and gear reduction means, said gear reduction means including a shaft, a shoulder on the shaft, a collar on said shaft in engagement with said shoulder, spring means secured to the supporting means and non-rotatably engaging the collar and effective to prevent rotation of the collar and to cause the collar to frictionally engage the shoulder whereby overtravel of the device is prevented upon deenergization of the motor, and means for adjusting the spring to alter the frictional force.

8. In a device of the class described, a valve casing, a valve operable in the casing, a valve stem extending outwardly from the casing, a cross-head mounted on the valve stem, a cross-head guide mounted on the valve casing for guiding the cross-head, a support carried by the cross-head guide, spaced parallel plates carried by the support, motor means mounted on the exterior of one of the plates, gear reducing means mounted between the plates, a shaft driven by the gear reducing means and extending outwardly of the plates, cranks carried by the shaft, pitmans connecting the cranks with the cross-head, a lost motion connection between the valve stem and the valve, a resilient means to extend the lost motion connection to provide a strain release, means to energize the motor means to open or close the valve, friction means in the gear reducing means to prevent overtravel of the device upon deenergization of the motor, a cover enclosing the moving parts, means securing the cover to the support, openings in the cover, and indicia on one of the pitmans cooperable with one of the openings to visually indicate the position of the valve, said other opening permitting manual manipulation of the gear reducing means to manually position the valve.

9. In a device of the class described, a motor, an actuator shaft, gear reduction means between the motor and the actuator shaft, means driven by the actuator shaft to complete a function, supporting means for the motor, shaft and gear reduction means, gear reduction means including a shaft, a shoulder on the shaft, a collar on said shaft in engagement with said shoulder, a leaf spring rigidly secured at one end to said support, and a nonrotatable connection between the other end of said leaf spring and said collar, said spring being effective both to prevent rotation of said collar and to cause the collar to frictionally engage the shoulder whereby overtravel of the device is prevented upon deenergization of the motor.

10. In a device of the class described, a valve casing, a valve operable therein, a valve stem extending outwardly from the casing, a cross-head slidably mounted on the valve stem, a cross-head guide mounted on the valve casing for guiding the cross-head, power means supported by the cross-head guide, a crank-shaft driven by the power means, a pitman between the crank-shaft and the cross-head, and resilient means between the cross-head and the valve to provide a strain release connection between the power means and the valve.

11. In a device of the class described, a valve casing, a valve operable therein, a valve stem extending outwardly from the casing, a cross-head slidably mounted on the valve stem and extending transversely thereof, power means supported by the valve casing, a crank-shaft driven by said power means, a pair of pitman connections between the crank-shaft and the cross-head, said pitmans being pivotally secured to the opposite extremities of said cross-head, and resilient means between the cross-head and the valve to provide a strain release connection between the power means and the valve.

12. In a device of the class described, a valve casing, a valve operable therein, a valve stem extending outwardly from the casing, a cross-head yieldably mounted on the valve stem and extending transversely thereof, a support secured to said valve casing, power operated actuating mechanism secured to said support, a crank-shaft driven by said power means, and a pair of pitman arms between said crank-shaft and the opposite ends of said cross-head, one on each side of said actuating mechanism.

13. In a device of the class described, a valve casing, a valve operable therein, a valve stem extending outwardly from the casing, a cross-head mounted on the valve stem and extending transversely thereof, a support secured to said valve casing, power operated actuating mechanism secured to said support, a crank-shaft driven by said power means, and a pair of pitman arms between said crank-shaft and the opposite ends of said cross-head one on each side of said actuating mechanism, said pitman arms being formed of sheet material having arcuate slots cut in one end thereof and said cross-head being formed of sheet material with the outer ends thereof curved to form arcuate portions extending into and movable within said arcuate slots.

14. In a device of the class described, a valve casing, a valve operable therein, a valve stem extending outwardly from said casing, a cross-head mounted on the valve stem, a support secured to said casing and having a downwardly extending flange surrounding said cross-head, actuating means carried by said support, connecting means between said actuating means and said cross-head, a cover enclosing said actuating means and connecting means, and locking means for releasably locking said cover to said support, said locking means being located within the annular space defined by said downwardly extending flange so as to be relatively inaccessible, said flange having an opening therein adjacent said locking means to permit the insertion of a key member therethrough for releasing said locking means.

15. In a device of the class described, a valve casing, a valve operable therein, a valve stem extending outwardly from the casing, a cross-head mounted on the valve stem, actuating mechanism for said valve, motion transmitting members extending between said actuating mechanism and the opposite ends of said cross-head and located exteriorly of said actuating mechanism, a cover enclosing the actuating mechanism and motion transmitting mechanism, said cover having an opening adjacent one of said motion transmitting members, and indicia on said one motion transmitting member cooperable with the opening to visually indicate the position of the valve.

16. In a device of the class described, a valve casing, a valve operable therein, power operated actuating mechanism for said valve, connecting means between said actuating means and said valve including a reciprocable motion transmitting member extending exteriorly of said actuating mechanism, a cover enclosing the actuating mechanism and connecting means, said cover having an opening adjacent said motion transmitting member, indicia on said motion transmitting member cooperable with the opening to visually indicate the position of the valve, and means on the same side of said cover as said opening to open said valve manually in the event of power failure.

17. In a device of the class described, a valve casing, a valve operable therein, a valve stem extending outwardly from the casing, a cross-head mounted on the valve stem and extending transversely thereof, power operated actuating mechanism for said valve, motion transmitting members extending between said actuating mechanism and the opposite ends of said cross-head and located exteriorly of said actuating mechanism, a cover enclosing said actuating mechanism and said motion transmitting mechanism, said cover having an opening adjacent one of said motion transmitting members, indicia on said one motion transmitting member cooperable with said opening to visually indicate the position of the valve, said cover having a second opening adjacent said first opening adapted to permit insertion of a key member therethrough, and means within said cover cooperable with said key member when the latter is inserted to actuate the valve in event of power failure, said second opening being upon the same side of the cover as said first opening to visually indicate to the operator the position of the valve.

18. In a device of the class described, a valve casing, a valve operable therein, power operated actuating mechanism for said valve, connecting means between said actuating means and said valve including a reciprocable motion transmitting member extending exteriorly of said actuating mechanism, a cover enclosing the actuating mechanism and connecting means, said cover having an opening adjacent said motion transmitting member, indicia on said motion transmitting member cooperable with the opening to visually indicate the position of the valve, said cover having a second opening adjacent said first opening adapted to permit insertion of a key member therethrough, and means within said cover cooperable with said key member when the latter is inserted to actuate the valve in event of power failure, said second opening being upon the same side of the cover as said first opening to visually indicate to the operator the position of the valve.

CARL G. KRONMILLER.